US005709771A

United States Patent [19]

Fritzman

[11] Patent Number: 5,709,771

[45] Date of Patent: Jan. 20, 1998

[54] METHOD AND APPARATUS FOR FORMING AN EXPANDABLE-COLLAPSIBLE ARTICLE HAVING A CONTOURED SURFACE

[75] Inventor: Ralph Fritzman, Sarasota, Fla.

[73] Assignee: Cellular Designs Unlimited, Inc., Sarasota, Fla.

[21] Appl. No.: 298,496

[22] Filed: Aug. 30, 1994

[51] Int. Cl.[6] .......... B32B 3/12

[52] U.S. Cl. .......... 156/474; 156/197; 493/410; 493/439

[58] Field of Search .......... 428/116, 118; 493/439, 966, 410, 411; 156/474, 494, 197

[56] References Cited

U.S. PATENT DOCUMENTS

| | | | |
|---|---|---|---|
| 2,387,163 | 10/1945 | Maxant | 223/30 |
| 2,495,130 | 1/1950 | Pilliner | 223/30 |
| 4,201,119 | 5/1980 | Wolf | 156/474 X |
| 4,465,213 | 8/1984 | Lehmann et al. | 223/30 |
| 4,465,214 | 8/1984 | Feiten et al. | 223/30 |
| 4,519,531 | 5/1985 | Clerici | 223/30 |
| 4,537,010 | 8/1985 | Mojden | 53/447 |
| 4,599,958 | 7/1986 | Stiers | 223/30 X |
| 4,795,515 | 1/1989 | Kao et al. | 428/116 X |
| 4,811,873 | 3/1989 | Ethridge et al. | 223/32 |
| 4,861,404 | 8/1989 | Neff | 428/118 X |
| 4,871,006 | 10/1989 | Kao et al. | 428/12 X |
| 4,943,454 | 7/1990 | Neff | 428/12 |
| 5,135,461 | 8/1992 | Corey et al. | 493/966 X |
| 5,147,278 | 9/1992 | Demura et al. | 493/439 |
| 5,193,601 | 3/1993 | Corey et al. | 156/197 X |
| 5,205,891 | 4/1993 | Neff | 156/292 X |

*Primary Examiner*—Henry F. Epstein
*Attorney, Agent, or Firm*—Holland & Knight LLP

[57] ABSTRACT

A method and apparatus for forming expandable-collapsible articles comprises a horizontally oriented frame which receives one or more webs of sheet material from a feeding mechanism, a pusher bar having upper and lower gripper members engageable with the sheet material and a stripper bar having upper and lower stripper members movable between folding position and discharge position with respect to the frame. One or more linear actuators are provided to move the pusher bar toward and away from the stripper bar, and the extent of linear movement of such actuators is adjustable so that different lengths of sheet material can be advanced by the pusher bar into contact with the stripper bar thus forming fold lines in the sheet material with varying spaces therebetween. An expandable-collapsible product is formed having an accordion fold configuration with an outwardly facing surface of essentially any desired contoured shape, or, alternatively, cellular articles are formed consisting of a series of side-by-side, elongated hollow cellular units which are formed by the same elements used in fabricating accordion folded articles, with the addition of adhesive dispensers and welding units.

67 Claims, 7 Drawing Sheets

METHOD AND APPARATUS FOR FORMING AN EXPANDABLE-COLLAPSIBLE ARTICLE HAVING A CONTOURED SURFACE

FIELD OF THE INVENTION

This invention is related to a method and apparatus for forming expandable-collapsible articles, and, more particularly, to a method and apparatus capable of forming pleated and/or cellular units for use as window treatments, filters and the like in which at least one surface formed by the interconnected pleats or cellular units has a contoured appearance.

BACKGROUND OF THE INVENTION

Expandable-collapsible products for use as window shades, filter media and similar articles have been manufactured in a variety of configurations by a number of different methods and apparatus. One type of expandable-collapsible product is a zig-zag or accordion folded article comprising a series of interconnected pleats such as disclosed, for example, in U.S. Pat. Nos. RE 27,094; 4,181,070; 3,921,432; 4,012,932 and others. Another type of construction is the so-called "honeycomb" or cellular structure wherein selected folded portions of one or more sheet materials are interconnected by adhesive or the like to form side-by-side, elongated hollow channels. Patents illustrative of honeycomb type expandable-collapsible products include U.S. Pat. Nos. 4,603,072; 4,631,108; 4,685,986; 4,631,217; 4,676,855; 4,677,012; and 4,677,013.

The pleated, accordion folded articles, and the honeycomb or cellular products noted above, are formed with a variety of different devices depending upon the particular configuration of the finished article desired and how various folds of the sheet materials forming the article are interconnected. The formation of the folds themselves in the sheet material requires a separate process step within a product fabricating system, or with a stand-alone unit, when forming either type of article noted above.

One method and apparatus for folding sheet material involves the use of cooperating rollers having intermeshing teeth. The teeth engage and fold the sheet material therebetween in the course of passage through the rollers. See, for example, U.S. Pat. Nos. 4,811,873; 4,871,006; and 5,193,601. Another type of folding apparatus employs a pusher bar which is horizontally movable toward and away from a vertically movable stripper bar. The pusher bar engages one or more sheets of material positioned atop the frame of the folding apparatus, and advances that portion of the sheet material between the pusher bar and stripper bar toward the stripper bar against which the sheet is folded. The stripper bar is moved vertically upwardly after the fold has taken place to allow the pleat just formed to move downstream, while the pusher bar is returned to its initial position, spaced from the stripper bar, in preparation for another folding operation. Apparatus of this general type are disclosed, for example, in U.S. Pat. Nos. 2,387,163; 2,495,130; 4,201,119; 4,871,404; 4,943,454; and 5,205,891.

One limitation of each of the methods and apparatus described above is that the resulting accordion folded article, and/or cellular article, has a planer surface. That is, the "peaks" or fold lines of the interconnected pleats forming the accordion type of expandable-collapsible article all lie in the same plane because all of the pleat heights are the same. This is also true for expandable-collapsible cellular articles made of a series of interconnected cellular units since the height or transverse dimension of each "cell", e.g. elongated hollow channel, is the same throughout the article. While expandable-collapsible articles having a planer surface are suitable for some applications, they are of limited aesthetic interest when used to form window treatments and the like, and are less than desirable in a variety of filtering applications.

SUMMARY OF THE INVENTION

It is therefore among the objectives of this invention to provide a method and apparatus for forming an expandable-collapsible article which has at least one outwardly facing, contoured surface, which is capable of forming both pleated, accordion folded articles and cellular articles, which is capable of varying or maintaining consistent the pleat height or cell height of each type of article, which is essentially completely automatic in operation, and, which produces pleated or cellular articles having precise dimensions.

These objectives are accomplished in a method and apparatus for forming expandable-collapsible articles comprising a horizontally oriented frame which receives one or more webs of sheet material from a feeding mechanism, a pusher bar having upper and lower gripper members engageable with the sheet material, a stripper bar having upper and lower stripper members movable between a folding position and discharge position with respect to the frame, and, a pre-creaser bar located between the pusher bar and stripper bar. One or more linear actuators are provided to move the pusher bar toward and away from the stripper bar, and the extent of linear movement of such actuators is adjustable so that different lengths of sheet material can be advanced by the pusher bar into contact with the stripper bar thus forming fold lines in the sheet material with varying spaces therebetween. An expandable-collapsible product is thus formed having an accordion fold configuration with an outwardly facing surface of essentially any desired contoured shape. Alternatively, cellular articles can be formed by the apparatus of this invention consisting of a series of side-by-side, elongated hollow cellular units which are formed by the same elements used in fabricating accordion folded articles, with the addition of adhesive dispensers and welding units.

One aspect of this invention is predicated upon the concept of providing an adjustable drive mechanism for the pusher bar which is capable of varying the position of the pusher bar with respect to the stripper bar in essentially any sequence, at any time during the operation of the apparatus. In the presently preferred embodiment, linear actuators such as ball and screw mechanisms are mounted at opposite ends of the pusher bar and are driven by one or more variable speed stepper motors whose operation is controlled by a programmable controller such as a personal computer. Depending upon the requirements of a particular application, the linear actuators are operative to position the pusher bar at essentially any distance, within a predetermined range, with respect to the fixed position stripper bar. Consequently, the length of the sheet material(s) between the pusher bar and stripper bar can be varied as desired, and in any given sequence.

This capability of the subject invention enables articles to be formed having a contoured or nonplaner outer surface of essentially any configuration. For example, zig-zag or accordion folded articles have a pleat height which is defined as the distance between two adjacent foldlines, i.e. from "peak-to-peak". Because the linear actuators which move the pusher bar are capable of adjusting the position of the pusher bar with respect to the stripper bar at the beginning of each successive folding operation, the distance between adjacent folds can be adjusted as desired, thus altering the pleat height from one pleat to another in any sequence within a predetermined height range. The pre-creaser bar assists in the folding operation by moving vertically upwardly into engagement with the sheet material between the pusher bar and stripper bar, thus forming a "bow" or pre-crease in the sheet material immediately in advance of the linear movement of the pusher bar to the stripper bar. The "outer surface" of the resulting article, e.g. the surface defined by adjacent peaks in the series of interconnected pleats, therefore has a non-planer or contoured shape which provides finished products such as window shades with an aesthetically distinctive appearance.

In the presently preferred embodiment, linear actuators are also provided to move at least one of the upper and lower gripper members of the stripper bar with respect to the other between a closed gripping position in which the gripper members engage one or more webs of sheet material therebetween, in preparation for movement to the stripper bar to form a fold, and a spaced position in which the gripper members disengage the sheet material allowing the pusher bar to return to an initial contact or gripping position in preparation for another folding operation. Similarly, linear actuators are employed with the stripper bar to move the upper and lower stripper members relative to one another between a closed, folding position for engagement with the sheet material and pusher bar, and a separated or discharge position which allows the pleat or cellular unit which has just been formed to pass downstream along the frame of the apparatus for further handling. Adjustment of the vertical movement of the upper and lower gripper members of the pusher bar, and the upper and lower stripper members of the stripper bar, is obtained by operation of the linear actuators associated therewith to accommodate sheet materials of different thickness.

Another aspect of this invention involves the use of the apparatus herein to form a cellular expandable-collapsible product in which a series of interconnected, side-by-side cellular units are formed, each of which is multi-sided and has an elongated hollow interior or core. The same pusher bar and stripper bar are employed as described above, with the addition of dispensers for applying adhesive, and one or more ultrasonic or laser welding units carried by the pusher bar.

In the presently preferred embodiment, two webs of sheet material are fed onto the frame of the apparatus, one on top of the other, such that each sheet has an exposed surface. A first adhesive dispenser applies longitudinally spaced beads of adhesive, each extending along the width of the exposed surface of one sheet, and a second adhesive dispenser applies adhesive beads on the exposed surface of the other sheet opposite the first adhesive beads. This adhesive dispensing step is performed upstream from the pusher bar where the ultrasonic or laser welding units are mounted. Such welding units are activated as the upper and lower gripper members of the pusher bar engage the two webs of sheet material, and they form an essentially continuous weld line along the width of the two sheets adjacent, but spaced from, the two adhesive beads on the exposed surfaces of the sheets. The linear actuators associated with the pusher bar are then operated to move the pusher bar, and that portion of the two sheets located between the pusher bar and the stripper bar, in a direction toward the stripper bar. In the course of such movement, an air tube introduces a jet of air between the two sheets so that they are separated from one another prior to engagement with the stripper bar.

A diamond-shaped cellular unit is formed each time the pusher bar and sheet material contact the stripper bar. Each cellular unit has opposed fold lines or peaks defining the overall height of the cellular unit, and opposed weld lines where the two sheets were interconnected by the ultrasonic or laser welding units. Additionally, each cellular unit has first and second exposed surfaces, each carrying one of the adhesive beads applied upstream, as described above. The other two exposed surfaces of each diamond-shaped cellular unit carry no adhesive. In an operation performed downstream from the stripper bar, the two exposed surfaces from one cellular unit which carry an adhesive bead are urged into engagement with the two surfaces of an adjacent cellular unit having no adhesive. As a result, small "pockets" are formed between adjacent cellular units, one on either side of the weld line therebetween, each comprising an elongated, open channel extending across the entire width of the sheet material. The interconnection of adjacent cellular units with beads of adhesive adds rigidity to the overall article, and the "pockets" provide a location for drawstrings to be inserted when the cellular units of this invention are utilized in the formation of window shades or similar expandable-collapsible articles. The pockets effectively hide such drawstrings from view and thus produce a more aesthetically pleasing product.

An important advantage of the apparatus and method of this invention, when forming either pleated, accordion folded articles or the cellular units described above, is the fact that the outwardly facing surface of such articles can be contoured in essentially any desired configuration. As noted above, the linear actuators associated with the pusher bar are adjustable and controlled by a programmable controller so that the distance between the pusher bar and stripper bar in successive folding operations is essentially infinitely variable. The resulting folded articles can have varying pleat heights in the case of zig-zag or accordion folded articles, or variable cell heights in the case of cellular articles, in essentially any desired sequence depending upon the aesthetic or functional requirements of a particular application. At least one outwardly facing surface is thus formed in either type of article having a "contoured" appearance, wherein the fold lines forming adjacent peaks of the pleats or cellular units lie in at least two different planes. The two-piece stripper bar and pusher bar employed herein further increase the efficiency of operation of the system, and are adjustable to accommodate sheet materials of varying thickness.

BRIEF DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE INVENTION

Figure 1:
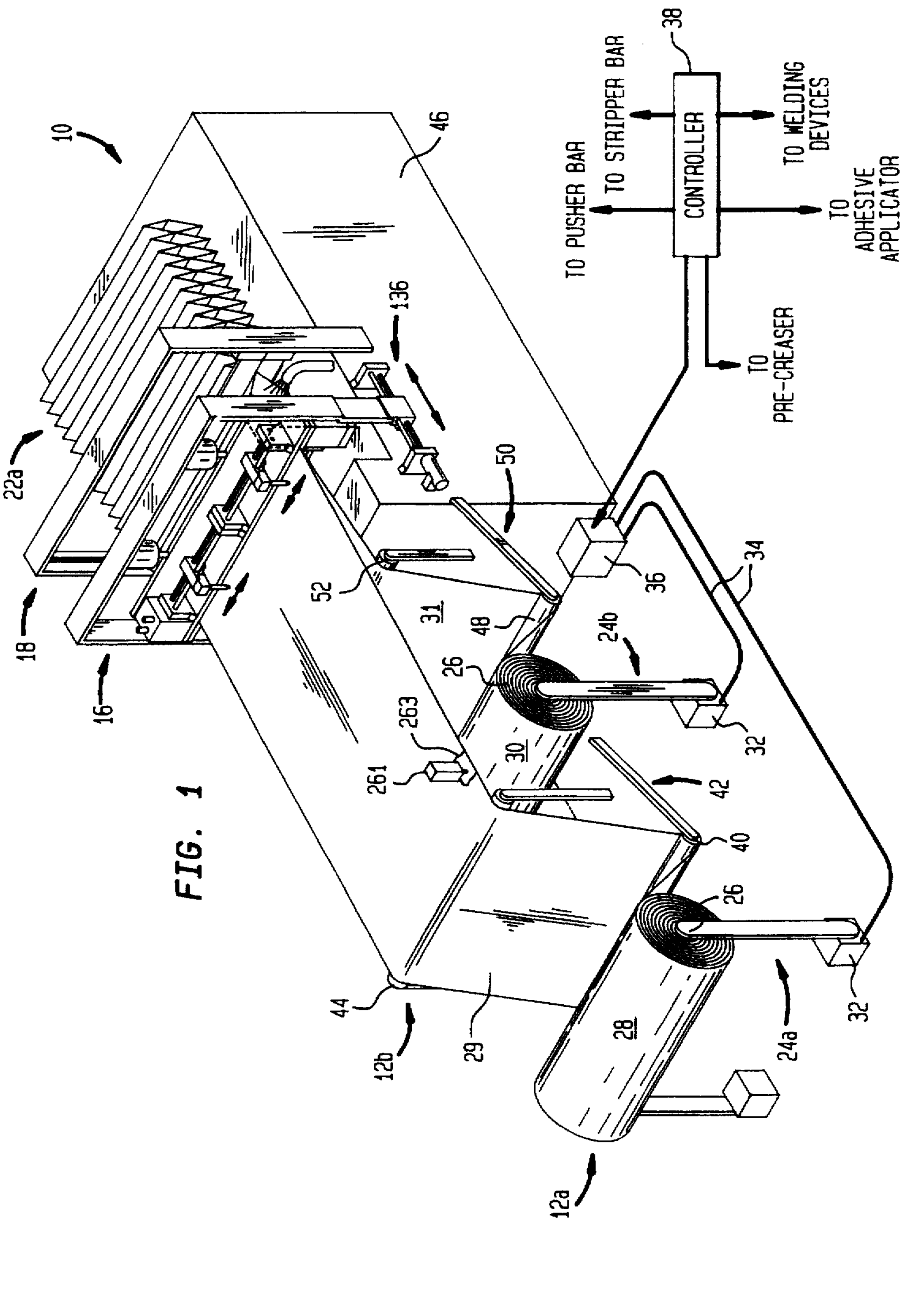
FIG. 1 is an overall perspective view of the apparatus of this invention.
Figure 2:
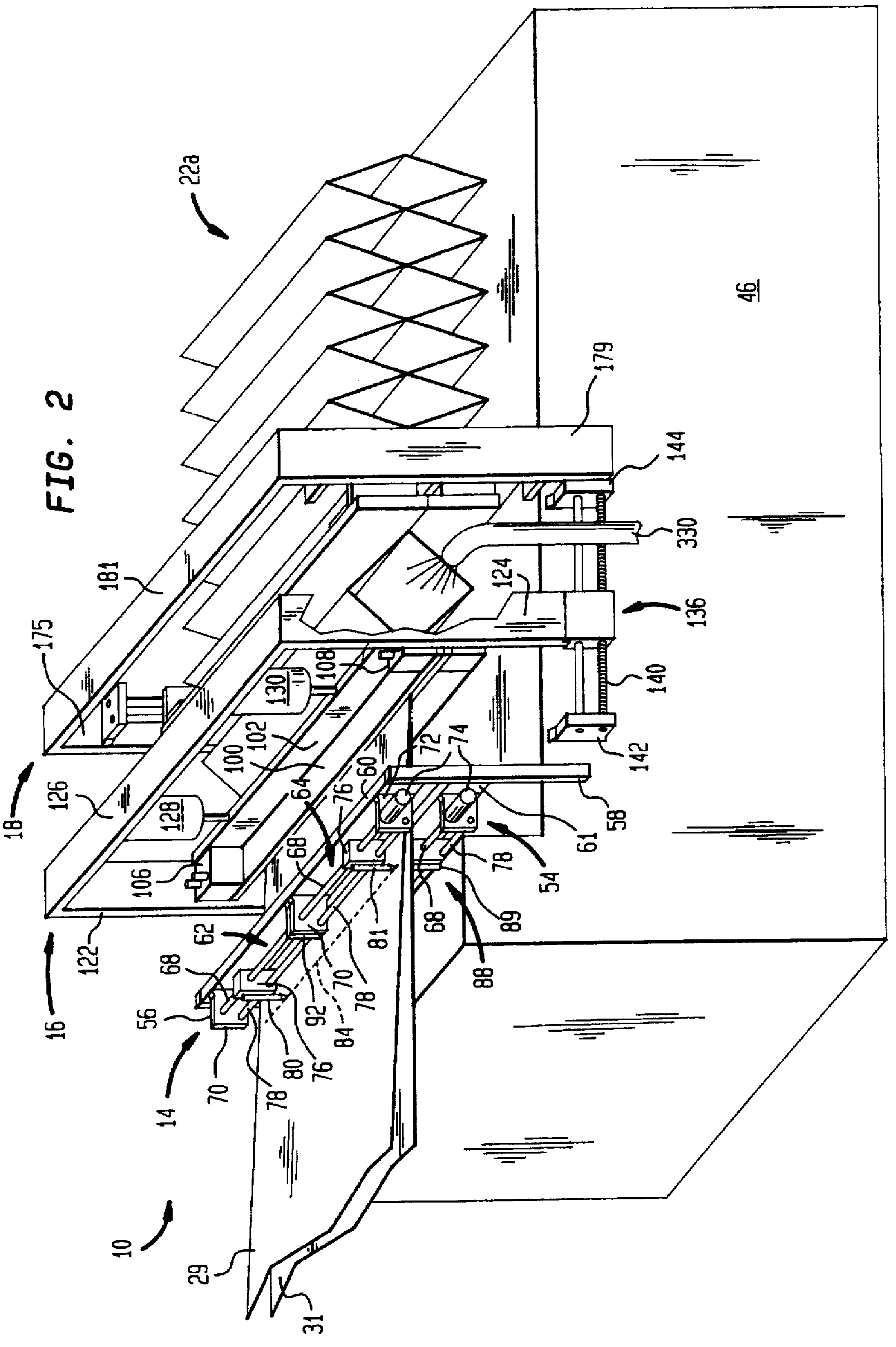
FIG. 2 is an enlarged view of a portion of FIG. 1 illustrating the adhesive applicator, pusher bar and stripper bar in greater detail.

Referring now to FIGS. 1 and 2, the apparatus 10 of this invention generally comprises two sheet feeding mechanisms 12*a* and 12*b*, an adhesive applicator unit 14, a pusher bar assembly 16, and, a stripper bar assembly 18. The apparatus 10 is operative to form zig-zag or accordion folded articles 20 (FIG. 10), and cellular articles 22*a*, 22*b* (FIGS. 6–7), as explained in more detail below. The following discussion will describe each of the system elements individually, followed by an explanation of the operation of apparatus 10 in forming the articles 20, 22*a* and 22*b*.

Sheet Feed Mechanisms

The sheet feed mechanisms 12*a* and 12*b* depicted schematically in FIG. 1 form no part of this invention of themselves, and therefore the details of the operation of same are not provided herein. Such sheet feed mechanisms 12*a*, 12*b* are commercially available, and are presently utilized in other types of apparatus for forming expandable-collapsible articles.

For purposes of the present discussion, and with reference to FIG. 1, the two sheet feed mechanisms 12*a* and 12*b* include support stands 24*a*, *b* each having a drive roller 26. The drive roller 26 of support stand 24*a* mounts a web 28 of sheet material 29, and the support stand 24*b* of sheet feed mechanism 12*b* mounts a web 30 of sheet material 31. As discussed in more detail below in connection with a description of the method of operation of apparatus 10, one of the sheet materials 29, 31 is utilized to form the zig-zag or accordion folded article 20, whereas both sheet materials 29, 31 are employed in the formation of cellular articles 22*a* and 22*b*.

The drive roller 26 of each support stand 24*a*, *b*, is drivingly connected to a DC drive 32, which, in turn, is connected by a line 34 to a drive controller 36. The operation of the drive controller 36 is controlled by a programmable system controller 38 such as a Catec Model PSQ-8 available from Custom Applied Technology Corporation of Sarasota, Fla., a dedicated computer or other suitable controller system. As described below, the system controller 38 controls all functions of the apparatus 10 and can be programmed to form essentially any configuration of the articles 20, 22*a* and/or 22*b*, as desired.

The sheet material 29 is unwound from web 28, fed around the roller 40 of a tensioner bar 42, and is then wrapped over a guide roller 44 from where the sheet material 29 extends onto the frame 46 of apparatus 10. The sheet material 31 from web 30 is fed in a similar manner to the frame 46, e.g. over the roller 48 of a tensioner bar 50, and then over a guide roller 52 to a position beneath the sheet material 29 from web 28. As discussed below in connection with a description of the formation of cellular articles 22*a* and 22*b*, the sheet materials 29, 31 are fed one on top of the other along frame 46 to the pusher bar assembly 16 and stripper assembly 18. In the formation of a zig-zag or accordion folded article 20, only one of the sheet materials 29 or 31 is required.

Adhesive Applicator

Referring now to FIG. 2, the adhesive applicator 14 is illustrated in more detail. As described below, the adhesive applicator 14 is only utilized in the formation of cellular articles 22*a* and 22*b*. It is not needed when the apparatus 10 is operating to form zigzag or accordion folded articles 20. Consequently, the discussion of the construction of adhesive applicator 14 which follows assumes the presence of both the upper sheet material 29 and lower sheet material 31 atop the frame 46.

In the presently preferred embodiment, a mounting bracket 54 is provided having a pair of support legs 56, 58 each connected to one side of the frame 46, and an upper cross brace 60 extending between the support legs 56, 58 in a position above the frame 46 and the sheet materials 29, 31 thereon. The upper cross brace 60 mounts a first ball and screw mechanism 62 which extends from mounting leg 56 to the center of cross brace 60. A second ball and screw mechanism 64 is also mounted to the upper cross brace 60 so that it abuts the first ball and screw mechanism 62 and extends to the second mounting leg 58. The ball and screw mechanisms 62, 64 are preferably of the type such as sold under the system Model No. 2AC, under the name "Powerslide", by Thomson Industries, Inc. of Port Washington, N.Y. Ball and screw mechanisms 62, 64 of this type include a rotatable, threaded shaft 68 which is mounted at opposite ends to bearings 70, 72. The threaded shaft 68 is rotated by a reversible motor 74, preferably carried by one of the housings for the bearings 70 or 72. A carriage 76 is movable along the threaded shaft 68 in response to the rotation thereof, and is slidable along one or more guide rods 78 extending between the bearing housings.

The ball and screw mechanisms 62, 64 mount adhesive dispensers 80 and 81, respectively, each having a nozzle disposed immediately above or in engagement with the upper sheet material 29. The adhesive dispensers 80, 81, in turn, are connected to a source of hot melt adhesive or the like (not shown). In response to rotation of the threaded shaft 68 of first and second ball and screw mechanisms 62, 64, by operation of motors 74, the two adhesive dispensers 80 and 81 are movable toward the center of the upper support plate 60, from a position adjacent the mounting legs 56, 58 of bracket 54, thus forming an adhesive bead 84 which extends across the width of upper sheet material 29 as depicted in phantom lines in FIG. 2. When the sheet material 29 is then advanced toward the pusher bar assembly 16 in a folding operation described below, the adhesive dispensers 80, 81 are moved by ball and screw mechanisms 62, 64 away from one another toward the mounting legs 56, 58, respectively, thus applying another adhesive bead (not shown) onto the upper sheet material 29 at a longitudinally spaced location from the first adhesive bead 84. Consequently, a series of longitudinally spaced adhesive beads 84 are applied to the exposed surface of the upper sheet material 29 across the entire width thereof. The term "longitudinally" as used herein refers to the direction of movement of the sheet materials 29, 31 along frame 46, and the "transverse" or "perpendicular" direction refers to a direction perpendicular to the movement of the sheet materials 29, 31 along frame 46.

Similar structure is employed to apply an adhesive bead 86 to the exposed surface of the lower sheet material 31. See also FIGS. 9–12. Third and fourth ball and screw mechanisms 88, one of which is shown in FIG. 2, are mounted to a lower cross brace 61 in position beneath the exposed surface of the lower sheet material 31. The lower cross brace 61 extends between and is mounted to the opposed legs 56, 58 of mounting bracket 54 in position beneath the upper cross brace 60. The ball and screw mechanisms 88 have the same structure as described above in connection with mechanisms 62, 64, and the same reference numbers are thereforto employed to identify like structure. The carriages 76 of third and fourth ball and screw mechanisms 88 mount adhesive dispensers 89, one of which is shown in FIG. 2, in position beneath the lower sheet material 31 such that the nozzle of each dispenser 89, contacts or nearly contacts the exposed surface of the lower sheet material 31. Such adhesive dispensers 89 are moved toward and away from one another in the same manner as described above for dispensers 80, 81 associated with ball and screw mechanisms 62, 64 so that longitudinally spaced adhesive beads 86 are applied to the lower sheet material 31 directly opposite the adhesive beads 84 on the upper sheet material 29. See FIGS. 9–12.

The two sheet materials 29, 31 are therefore transmitted to the pusher bar assembly 16 and stripper bar assembly 18 with aligning, longitudinally spaced adhesive beads 84, 86 on the exposed surfaces thereof. Operation of the reversible motors 74 associated with each of the ball and screw mechanisms 62, 64, and 88 is controlled by the system controller 38 to ensure that the adhesive beads 84 and 86 are applied at the correct intervals along the sheet materials 29, 31 depending upon the size or height of the cellular articles 22*a* or 22*b* to be formed, as described in more detail below.

ps Pusher Bar Assembly

Figure 3:
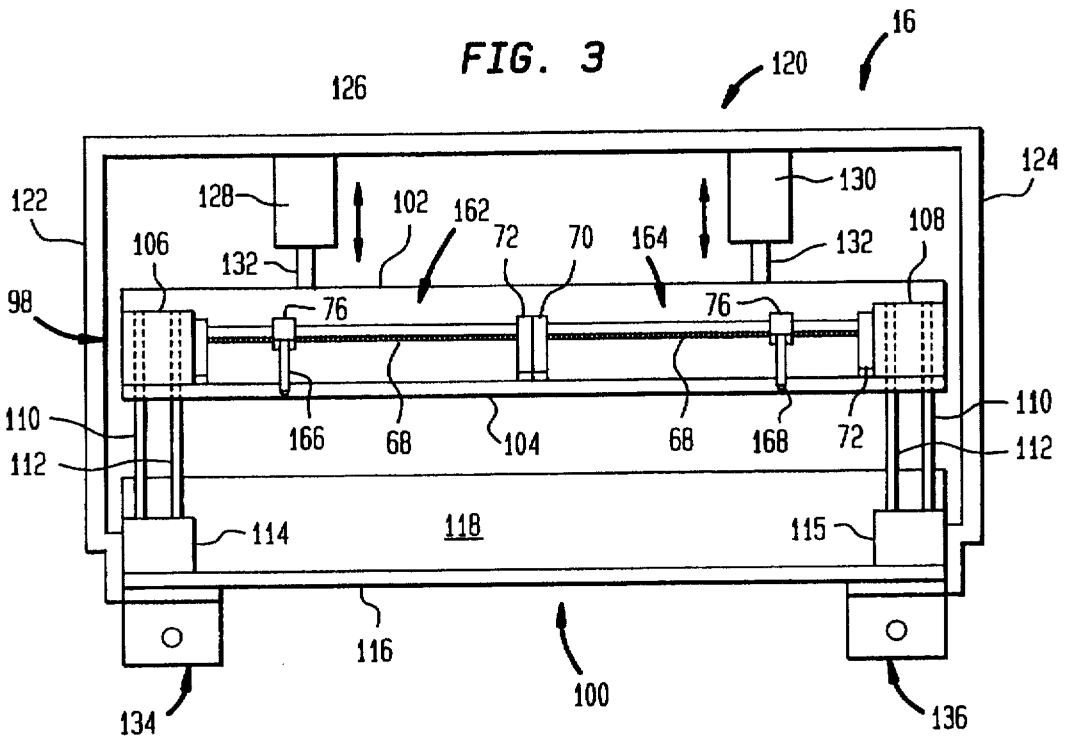
FIG. 3 is a view in partial cross section taken generally along line 3—3 of FIG. 2.
Figure 5:
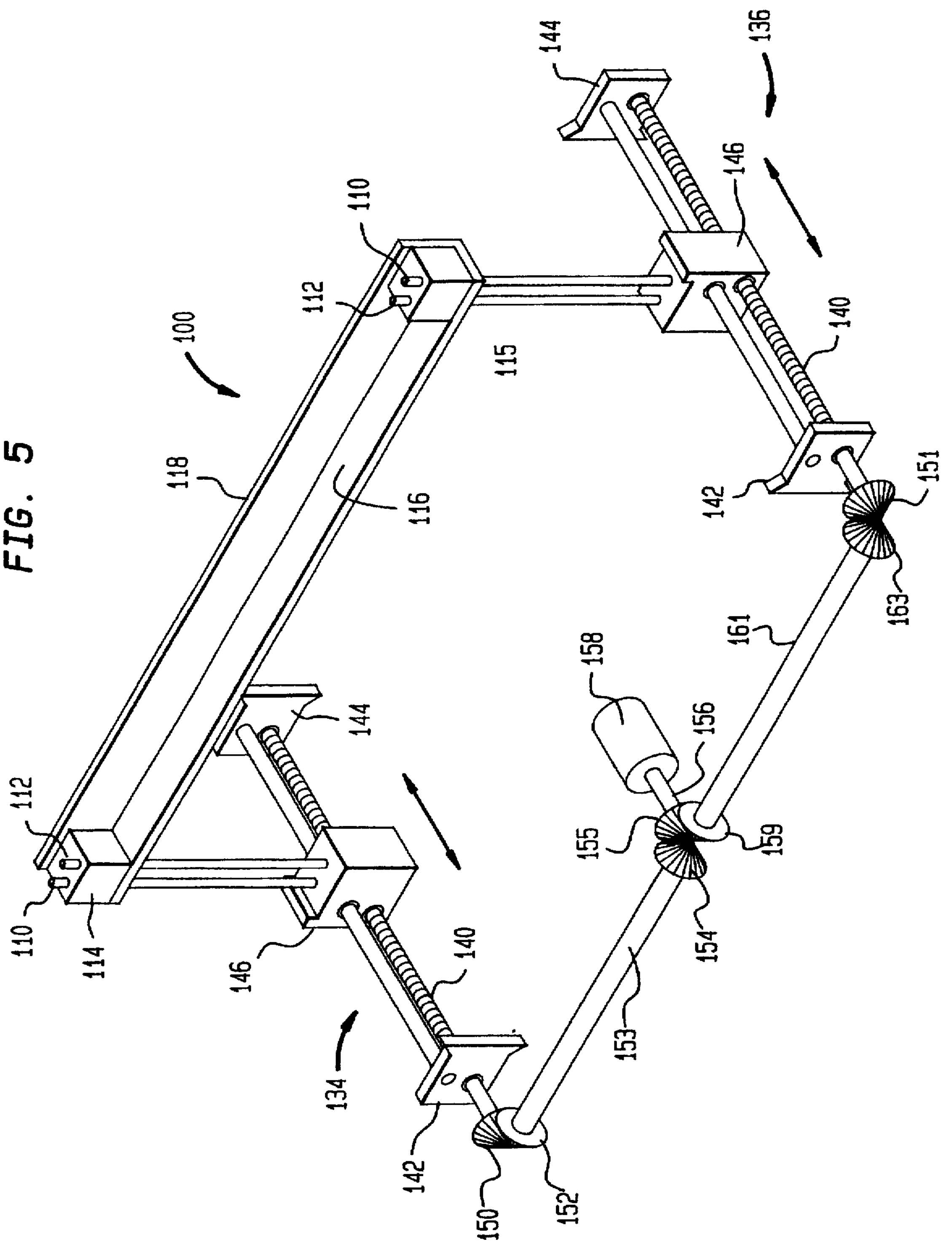
FIG. 5 is a view in partial cross-section of the drive mechanism associated with the pusher bar.

With reference to FIGS. 2, 3 and 5, the pusher bar assembly 16 is illustrated in detail. As described below in connection with a discussion of the operation of apparatus 10, the purpose of the pusher bar assembly 16 is to advance a selected length of sheet material 29 and/or 31 to the stripper bar assembly 18 against which the folding operation takes place to form a pleat or a cellular unit. An important advantage of the apparatus 10 of this invention is that the movement of the pusher bar assembly 16 is adjustable, i.e. it can be moved to essentially any number of starting or contact positions along the length of sheet materials 29 and/or 31, and thus initiate successive folding operations at different, spaced positions with respect to the stripper bar assembly 18.

In the presently preferred embodiment, the pusher bar assembly 16 comprises an upper gripper member 98, and a lower gripper member 100 which is located vertically beneath the upper gripper member 98. As best seen in FIGS. 2 and 3, the upper gripper member 98 is generally L-shaped having a vertical plate 102 connected to a horizontal plate 104 with guide blocks 106, 108 mounted on either side of the horizontal plate 104. These guide blocks 106, 108 each receive a pair of guide rods 110, 112 which extend downwardly therefrom to guide blocks 114, 115, respectively, mounted on the base plate 116 of lower gripper member 100. The base plate 116 is connected to a vertical plate 118, forming the same general L-shape as upper gripper member 98, and such vertical plate 118 is oriented in alignment with the vertical plate 102 of upper gripper member 98.

The upper gripper member 98 is supported in position above the lower gripper member 100 by a pair of hydraulic or pneumatic cylinders 128, 130 carried by the cross plate 126 of a mounting bracket 120 having opposed legs 122, 124 whose upper ends mount the cross plate 126. The lower ends of legs 122, 124, in turn, are connected to the base plate 116 and guide blocks 114, 115 associated with the lower gripper member 100. The cross plate 126 mounts the hydraulic or pneumatic cylinders 128, 130 in position such that the piston rod 132 of each cylinder 128, 130 connects to the vertical plate 102 of upper gripper member 98. The cylinders 128, 130 are operative to extend and retract their associated piston rods 132, which, in turn, moves the upper gripper member 98 toward and away from the lower gripper member 100. Such movement of the gripper members 98, 100 is guided by the guide rods 110, 112 extending therebetween so that in the extended position of piston rods 132, the vertical plate 102 of upper gripper member 98 engages the vertical plate 118 of lower gripper member 100 across substantially the entire width of the pusher bar assembly 16 and frame 46. As discussed in more detail below in connection with an explanation of the operation of apparatus 10, movement of the upper and lower gripper members 98, 100 into engagement with one another temporarily clamps or grips one or both of the sheet materials 29, 31 therebetween for movement to the stripper bar assembly 18 in order to perform a folding operation.

Opposite ends of the lower gripper member 100 are mounted on a pair of adjustable linear actuators 134, 136, preferably of the type sold under Model No. RX 102B-12-M55-MC by Industrial Devices Corporation of Novato, Calif. With reference to FIG. 5, each linear actuator 134, 136 includes a threaded shaft 140 carried by bearings 142, 144 at opposite ends, and having a carriage 146 movable between the bearings 142, 144 in response to rotation of the threaded shaft 140. The carriage 146 of each linear actuator 134, 136, in turn, is connected to the base plate 116 of lower gripper member 100, as schematically depicted in FIG. 5 and shown in FIG. 3.

The threaded shaft 140 of linear actuators 134, 136 each mount a bevel gear 150, 151, respectively. Bevel gear 150 is drivingly connected to a bevel gear 152 mounted at one end of a shaft 153 whose opposite end carries a bevel gear 154 mounted in position to mesh with a drive gear 155 on the output shaft 156 of a stepper motor 158, preferably of the type sold under Model No. 583-135-MO by The Control Division of Parker Hannifan Corporation of Wadsworth, Ohio. The stepper motor 158 is mounted to the frame 46 approximately in the center thereof, e.g. midway along the lower gripper member 100, and is operated by a motor controller (not shown) connected to the system controller 38. The drive gear 155 on the output shaft 156 of stepper motor 158 also meshes with a bevel gear 159 carried at one end of a shaft 161. The opposite end of shaft 161 mounts a bevel gear 163, which, in turn, meshes with a bevel gear 151 on the shaft 140 of linear actuator 136. Preferably, each of the shafts 153 and 161 are rotatably supported by a bearing (not shown) at either end.

The output shaft 156 of stepper motor 158 is rotatable both in the clockwise and counter-clockwise directions to precisely control the rotation of the threaded shafts 140 associated with each linear actuator 134, 136 via the drive trains described above. The carriage 146 of each linear actuator 134, 136, and, hence, the lower gripper member 100, are therefore moved in an axial direction with respect to the threaded shafts 140 and longitudinally along the frame 46. Because the upper gripper member 98 is connected to the lower gripper member 100 by the mounting bracket 120, the entire pusher bar assembly 16 is moved toward and away from the stripper bar assembly 18, as a unit, in response to operation of the stepper motor 158.

The linear actuators 134, 136 are illustrated in the FIGURES as ball and screw mechanisms capable of precise, and essentially infinitely adjustable, linear movement in response to operation of the stepper motor 158. It is contemplated that other "adjustable" linear actuators could be employed in this invention, such as hydraulic or pneumatic cylinders, so long as they have the capability of precisely locating and moving the upper and lower gripper members 98, 100 with respect to the stripper bar assembly 18. As described more fully below, an important aspect of this invention is predicated on the capability of apparatus 10 to selectively and precisely vary the spacing between the pusher bar assembly 16 and stripper bar assembly 18 by operation of the linear actuators 134, 136 so that different lengths of sheet material 29 and/or 31 located between the pusher bar assembly 16 and stripper bar assembly 18 can be folded to produce articles 20, 22*a* and/or 22*b* of varying size.

The pusher bar assembly 16 also includes structure required in the manufacture of cellular articles 22*a* and 22*b*, as described in more detail below in connection with a discussion of the method of operation of apparatus 10. In the presently preferred embodiment, the horizontal plate 104 of upper gripper member 98 mounts a pair of ball and screw mechanisms 162, 164 of the same type as ball and screw mechanisms 62, 64 described above in connection with a discussion of the adhesive applicator 14. As such, the same reference numbers used in a description of mechanisms 62, 64 are repeated in FIG. 3 to depict the same structure of mechanisms 162, 164.

The ball and screw mechanisms 162, 164 mount welding devices 166, 168, respectively, in position immediately above the exposed surface of the upper sheet material 29. The welding devices 166, 168 are preferably ultrasonic welders such as sold by the Branson Ultrasonics Corporation of Danbury, Conn. Alternatively, laser welding devices can be employed of the type sold by The Industrial Laser Source of Hopedale, Mass. The welding devices 166, 168 are moved by ball and screw mechanisms 162, 164 toward one another to the center of upper gripper member 98, and then away from one another to the ends thereof. A separate weld line 170 is formed during each of such movements of the welding devices 166, 168 which interconnect the sheet materials 29 and 31. See also FIGS. 9–12.

The operation of ball and screw mechanisms 162, 164 is governed by controller 38 so that the welding devices 166, 168 are activated in timed sequence with the movement of the sheet materials 29 and 31 along frame 46. As a result, longitudinally spaced weld lines 170 are formed along the length of the sheet materials 29, 31 at locations proximate the point where the adhesive beads 84, 86 were applied by the adhesive dispenser assembly 14. As discussed below, individual cellular units of cellular articles 22*a* and 22*b* are formed between adjacent weld lines 170, and a fold line is formed in the sheet materials 29, 31 midway between adjacent weld lines 170.

Stripper Bar Assembly

Figure 4:
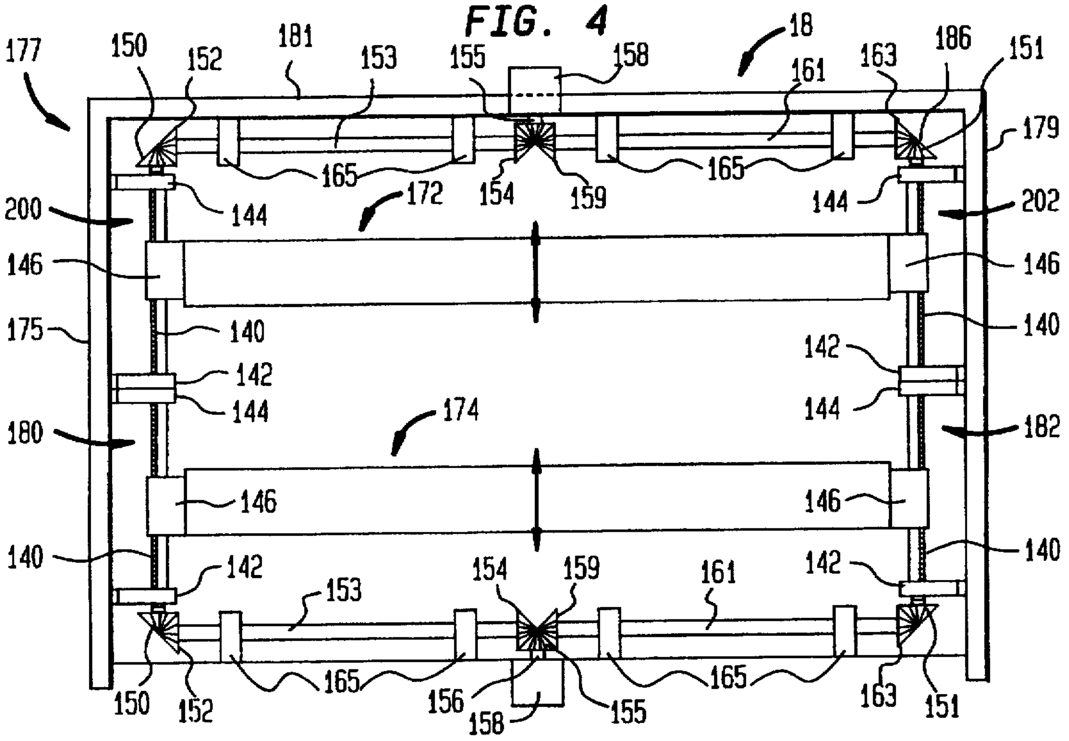
FIG. 4 is a view in partial cross section taken generally along line 4—4 of FIG. 2.

Referring now to FIGS. 1 and 4, the stripper bar assembly 18 comprises an upper stripper bar 172 and a lower stripper bar 174 which are both movable toward and away from one another between a folding position in which the upper and lower stripper bars 172, 174 contact one another (FIG. 2), and a discharge position where they are spaced from one another (FIG. 4). Vertical movement of the upper and lower stripper bars 172, 174 is accomplished with the same type of adjustable linear actuators 134, 136 used in the pusher bar assembly 16. A detailed description of the linear actuators employed with the stripper bar assembly 18 is therefore not repeated herein, and the same reference numbers employed in FIGS. 1 and 3, are utilized in FIG. 4.

The lower stripper bar 174 is mounted at either end to the carriage 146 of ball and screw mechanisms 180 and 182, which, as noted above, are essentially identical to ball and screw mechanisms 134, 136 of the pusher bar assembly 16. The carriage 146 of each ball and screw mechanism 180, 182 is movable along threaded shaft 68 rotatably carried by bearings 142, 144. The bearings 142, 144 of ball and screw mechanism 180 are mounted to one support leg 175 of a stripper bar mounting bracket 177, and the bearings 142, 144 of the other ball and screw mechanism 182 are mounted to the opposite support leg 179 of mounting bracket 177. The lower end of support legs 175, 179 mount to the frame 46, and the upper end thereof carry a cross brace 181 extending therebetween. The threaded shaft 140 of each ball and screw mechanism 180, 182 is drivingly connected to the output shaft 156 of stepper motor 158, via shafts 153, 161 in the same manner described above in connection with a discussion of actuators 134, 136 and FIG. 5. The stepper motor 158 is connected to a motor controller (not shown) which, in turn, is connected to the system controller 38. The ball and screw mechanisms 180, 182 are operative to raise and lower the lower stripper bar 174 with respect to the upper stripper bar 172 upon actuation of the stepper motor 158.

Similar structure is provided to move the upper stripper bar 172 with respect to the lower stripper bar 174. As shown in FIG. 4, the upper stripper bar 172 is carried by a pair of ball and screw mechanisms 200, 202, which are mounted to the support legs 175, 179 of mounting bracket 177 in the same manner as ball and screw mechanisms 180, 182. The ball and screw mechanisms 200, 202 have the same structure and function as ball and screw mechanisms 180, 182, and are given the same reference numbers in FIG. 4, except that another stepper motor 158 is mounted to a cross brace 181 extending between the support legs 175, 179 of mounting bracket 177 in order to drive ball and screw mechanisms 200, 202.

In the presently preferred embodiment, each of the shafts 153 and 161 are rotatably supported by a bearing 165 at either end. As schematically depicted in FIG. 1 and discussed in more detail below, the upper and lower stripper bars 172, 174 are movable toward one another to a folding position in which they contact one another to provide a surface against which the pusher bar assembly 18 is movable for folding the sheet material 29 and/or sheet material 31. After a folding operation has been completed, the upper and lower stripper bars 172, 174 are moved to a discharge position, spaced from one another, to allow the pleat of article 20 or cellular unit of article 22 which has just been formed to move therepast.

Pre-Creaser Bar

Figure 6:
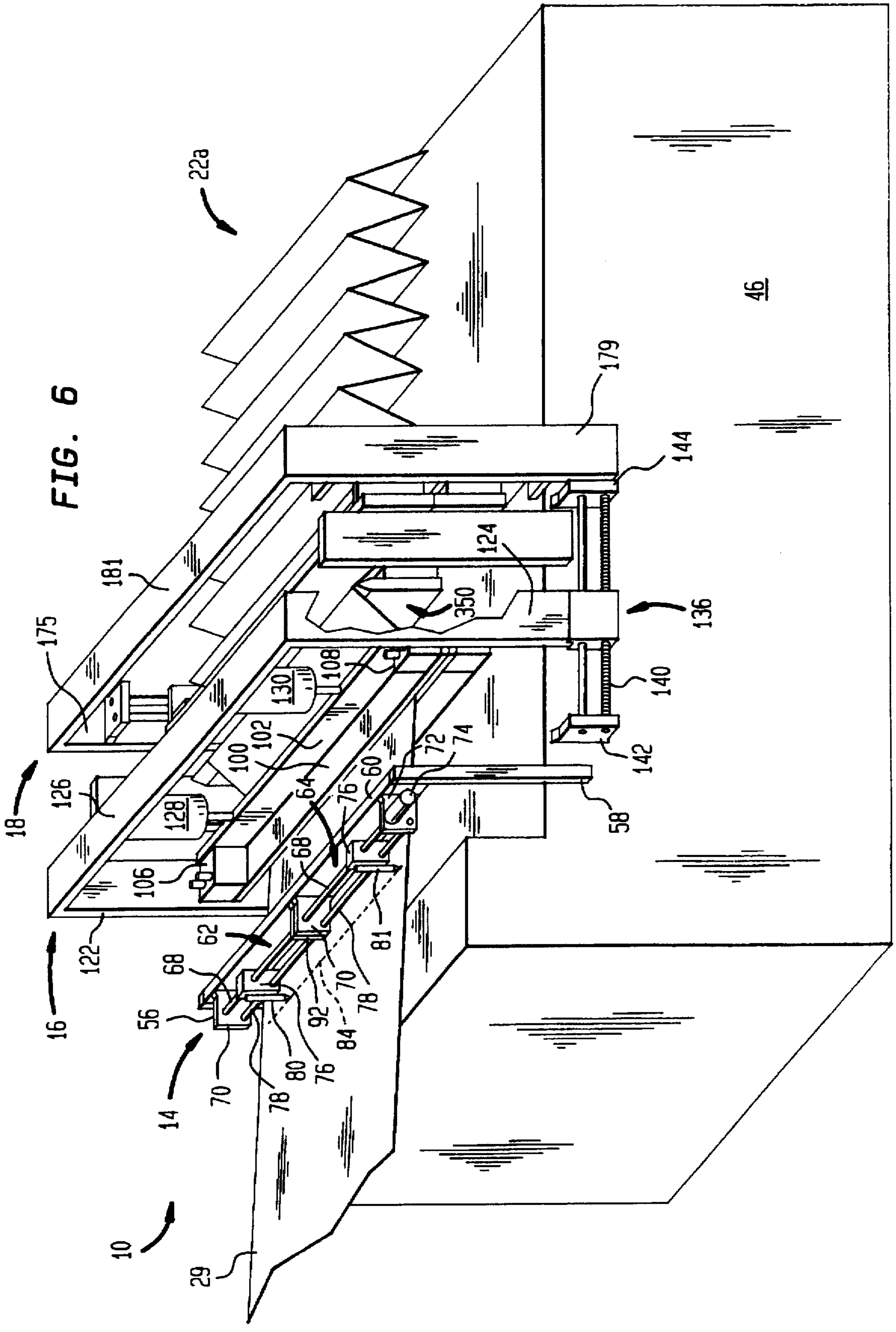
FIG. 6 is a view similar to FIG. 2, except depicting a pre-creaser bar instead of an air jet which is used to form accordion-folded articles.
Figure 7:
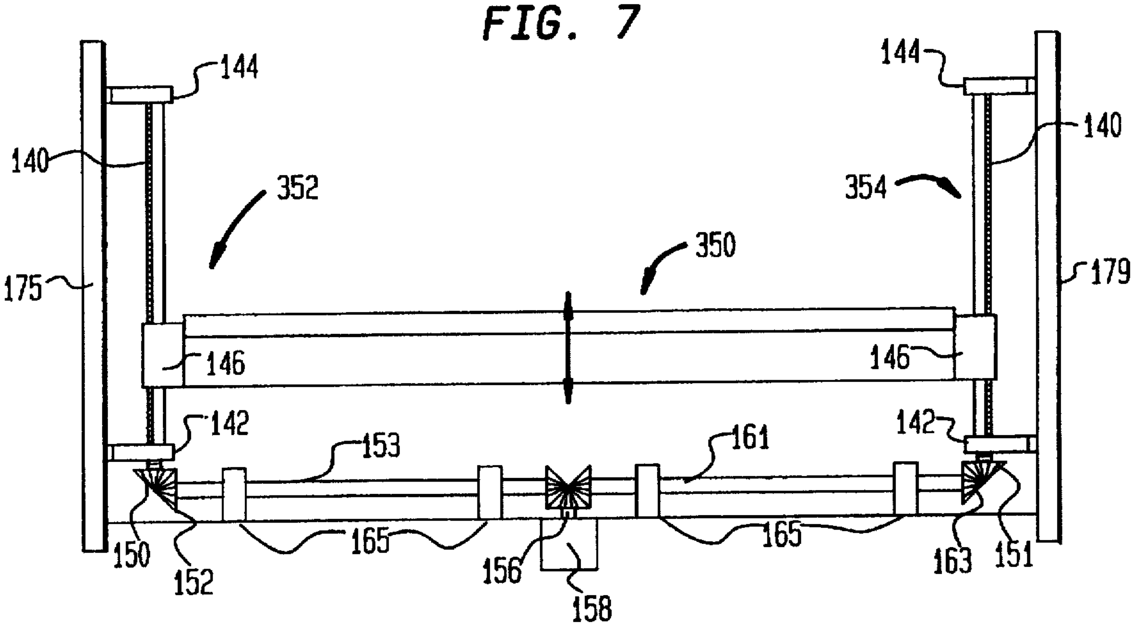
FIG. 7 is an enlarged view of the pre-creaser bar shown in FIG. 6.

With reference now to FIGS. 6 and 7, the apparatus 10 is shown in a configuration to form accordion folded articles 20. As described in more detail below, the primary operational differences in the apparatus 10 when forming an article 20 compared to cellular articles 22*a* or 22*b* is that the adhesive applicator unit 14 and welding devices 166, 168 are not needed, and only one of the sheet material 29 or 31 is employed. Additionally, an air tube 330 used in forming cellular articles 22*a*, *b* is not operated.

Instead, the apparatus 10 is provided with a pre-creaser bar 350, located between the pusher bar assembly 16 and stripper bar assembly 18, which is effective to form a "bow" in the sheet material 29 or 31 in advance of the folding operation. As best seen in FIG. 7, the pre-creaser bar 350 is mounted to the frame 46 by a pair of ball and screw mechanisms 352, 354 of the same type as assemblies 180, 182 shown in FIG. 4 and described above in connection with a discussion of the stripper bar assembly 18. The same reference numbers are therefor used in FIG. 7 to depict structure identical to that shown in FIG. 4.

The ball and screw mechanisms 352, 354, in response to operation of stepper motor 158, are effective to move the pre-creaser bar 350 vertically upwardly from a position beneath the sheet materials 29 or 31 to a contact position wherein a bow is formed in that portion of the sheet material 29 or 31 between the pusher bar assembly 16 and stripper bar assembly 18. This assists the pusher bar assembly 16 in forming a pleat along the accordion folded article 20, as described in more detail below, and can also be employed to vary the heights of such pleats. Preferably, each of the ball and screw mechanisms 352, 354 are mounted on a track or the like (not shown) to permit adjustment of the longitudinal position of the pre-creaser bar 350 along frame 46 and between the pusher bar assembly 16 and stripper bar assembly 18 depending upon the height of the pleats to be formed in the finished accordion folded article 20.

Method of Forming Cellular Articles

With reference initially to FIGS. 1–5, 9–12 and 14, the operation of apparatus 10 to form cellular articles 22 is described. As noted above, the apparatus 10 also can be utilized to form zig-zag or accordion folded articles 20 of the type shown in FIGS. 13 and 14 and a discussion of that operation follows.

The formation of cellular articles 22 requires the presence of both sheet materials 29 and 31. The sheet feed mechanisms 12 are operated as described above to supply the sheet materials 29, 31, one on top of the other, onto the frame 46 of apparatus 10. The details of the sheet feeding devices and their operation form no part of this invention, and are therefore not described specifically herein. It should be understood, however, that the tensioner bars 42, 50 and other tensioning devices are employed, as well as other sheet feeding controls, to ensure that the sheet materials 29, 31 are supplied to the pusher bar assembly 16 at the appropriate speed and tension.

Additionally, although not described in detail herein, the frame 46 is provided with heating elements (not shown) upstream from the pusher bar assembly 16 to raise the temperature of the sheet materials 29, 31 to a sufficient level so that they will take a "set" i.e. maintain their folded position, when the folding operation is completed. It is contemplated that most of the sheet materials 29, 31 worked on by apparatus 10 will include at least some thermoplastic material, either as a coating or contained within the sheet material, so that fold lines made therein are essentially permanent. These heating elements 47 form no part of this invention of themselves, and are therefore not discussed in detail herein. Such heating elements are commercially available and are commonly employed in a variety of pleat forming devices.

An important aspect of the method of operation of apparatus 10 is its capability of forming cellular articles 22*a* and 22*b* of different size, and different shapes or contours, as desired. Before describing the specific operational steps involved in the formation of articles 22*a* or 22*b*, it is helpful to consider the finished construction of each. With reference initially to FIGS. 6 and 7, the cellular article 22*a* is depicted as including a number of interconnected, diamond-shaped cellular units 226 of the same size and shape. Each cellular unit 226 has a first side 228 which receives adhesive bead 84, a second side 230 to which adhesive bead 86 is applied, and, third and fourth sides 232, 234 which receive no adhesive. The first and third sides 228, 232 are separated by a fold line 236, whereas the second and fourth sides 230, 234 are separated by a fold line 238. The overall height or dimension of each cellular unit 226, or "peak-to-peak" dimension, is constant and is defined by the distance between the fold lines 236, 238. This forms an outwardly facing surface 227 of cellular article 22*a* having a planar appearance.

Figure 9:
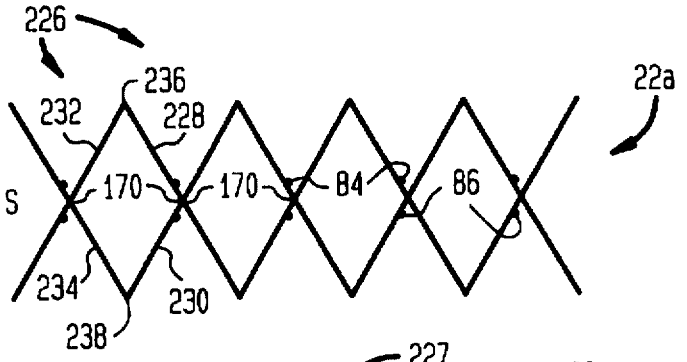
FIG. 9 is a schematic view of a portion of a partially finished, cellular article made in accordance with this invention.
Figure 10:
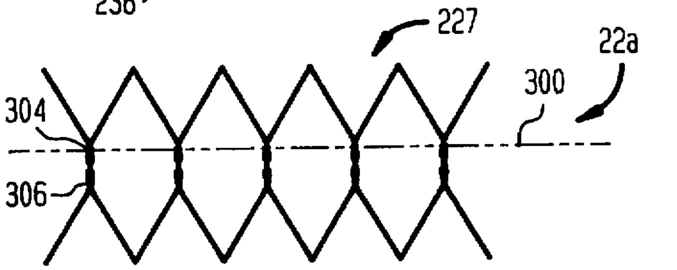
FIG. 10 is a view similar to FIG. 6 except of the completed cellular unit.
Figure 12:
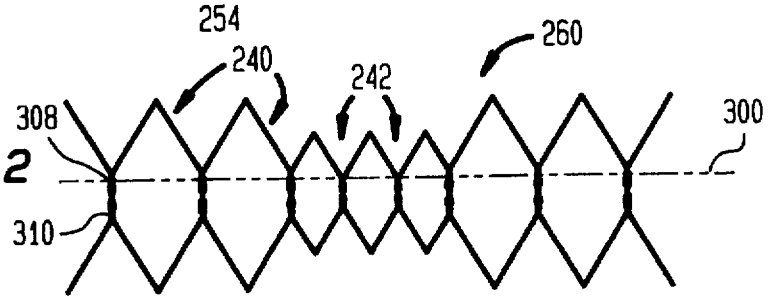
FIG. 12 is a schematic view of the finished cellular article depicted in FIG. 8.

With reference to FIGS. 10 and 12, the cellular article 22*b* differs from that of article 22*a* by incorporating first cellular units 240 of one dimension and second cellular units 242 of a different dimension. Each first cellular unit 240 includes first and second sides 244, 246 which carry the adhesive beads 84, 86, respectively, and third and fourth sides 248, 250 with no adhesive. A fold line 252 separates sides 244, 248, while a fold line 254 separates sides 246, 250. The second cellular units 242 have the same diamond-shape as the cellular units 240, but with a smaller height or peak-to-peak dimension between the fold lines 256, 258 which separate sides 260, 266 and sides 262, 264, respectively, thereof. While the cellular article 22*b* is shown with two cellular units 240 and 242, arranged in the pattern depicted in FIGS. 9 and 10, it will be appreciated that essentially any combination of cellular unit heights and patterns can be obtained with apparatus 10, within predetermined dimensional ranges.

Figure 11:
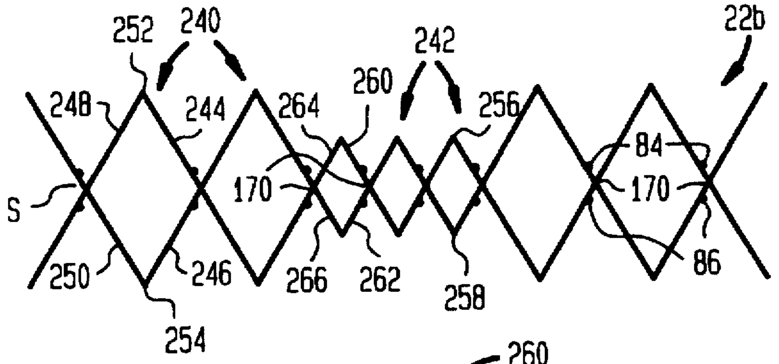
FIG. 11 is a view similar to FIG. 6 except of an alternative embodiment of a cellular article made in accordance with the method and apparatus herein.

It is apparent from an inspection of the cellular units 240 and 242 within cellular article 22*b* of FIGS. 11 and 12 that the formation of same depends upon the proper location of the adhesive beads 84, 86, the weld lines 170 and the fold lines 252, 254, 256 and 258 with respect to one another along the length of sheet materials 29 and 31. The fold lines 252, 254 must be centered between adjacent weld lines 170 within cellular units 240, and such weld lines 170 must be a sufficient distance apart to obtain the desired height or peak-to-peak dimension of cellular unit 240. Further, the adhesive beads 84, 86 must be positioned along the sheet materials 29, 31 so that they are located on the appropriate sides 244, 246, respectively, of cellular unit 240 and equidistant from an adjacent weld line 170. The same control of the positioning of the adhesive beads 84, 86, weld lines 170 and fold lines 256, 258 is required to form cellular unit 242, except the location of same is different from that of cellular unit 240.

The system controller 38 is operative to control the adhesive applicator assembly 14, the welding devices 166, 168 and the pusher bar assembly 16 in the appropriate intervals based upon the speed of movement of the sheets 29, 31 along frame 46, and the arrangement of cellular units 240, 242 desired to obtain a given cellular article 22*b* having an outer surface 260 with the desired contour or pattern. As described more fully below, the adhesive beads 84, 86 are applied at the desired locations along sheets 29 and 31 by timed operation of adhesive dispensers 80, 81 and adhesive dispensers 92. The welding devices 166, 168, in turn, are also timed by system controller 38 to form the weld lines 170 adjacent the adhesive beads 84, 86. Additionally, the position of fold lines 252, 254, 256, and 258 is obtained by controlling linear actuators 134, 136 so that the pusher bar assembly 16 is located the appropriate distance from stripper bar assembly 18 at the beginning of a folding operation.

The manner in which the system controller 38 operates to obtain cellular articles 22*a* and 22*b* of a desired configuration is dependent on the particular application. The operator has the option of programming the system controller 32, using a manual, keyboard interface (not shown), to specify the particular size and sequence of cellular units within a cellular article such as articles 22*a*, 22*b*. Essentially any sequence of different cellular units can be obtained having a size within a predetermined range which is limited by the extent of movement of linear actuators 134, 136 associated with pusher bar assembly 16.

Alternatively, the apparatus 10 is provided with a sensor 261, connected to the controller 38, which is operative to produce a signal when an indicia 263 applied to the upper sheet material 29 moves therepast. This indicia 263 may be a special mark placed on the sheet material 29, or a portion of a pattern present upon the upper sheet material 29. The sensor 261 is located sufficiently upstream from the adhesive applicator 14, welding devices 166, 168, and pusher bar assembly 16 so that the controller 38 can function to operate the adhesive dispensers 80, 81 and 89, as well as the welding devices 166, 168, at appropriate intervals. Further, the controller 38 operates the pusher bar 16 in response to such signal so that fold lines 252, 254, 256 and/or 258 can be formed along the sheet materials 29, 31 at the required location dependent upon where the indicia 263 is sensed by the sensor 261.

With the foregoing in mind, the individual operations to: (1) apply adhesive beads 84, 86; (2) form weld lines 170, and, (3) obtain folds 252, 254, 256 and 258, are described separately below.

The sheet materials 29, 31 are advanced to the adhesive applicator 14 where their exposed surfaces receive adhesive beads 84, 86, respectively. As noted above, the upper adhesive dispensers 80, 81 are moved by first and second ball and screw mechanisms 62, 64 toward and away from one another in position immediately above the exposed surface of upper sheet material 29. These adhesive dispensers 80, 81 are operative to apply the adhesive bead 84 onto the sheet material 29 in both directions of the movement thereof, i.e. while moving toward one another to the middle of mounting bracket 54, and away from one another toward the bracket mounting legs 56, 58. Similarly, the adhesive dispensers 89 carried by the third and fourth ball and screw mechanisms 88 of adhesive applicator 14, located beneath the lower sheet material 31, apply adhesive bead 86 to the lower sheet material 31 in direct alignment with the adhesive bead 84.

The next step in the operation of apparatus 10 to form cellular articles 22*a* or 22*b* is to interconnect the sheet material, 29, 31 at spaced locations therealong. The controller 38 is effective to form longitudinally spaced weld lines 170, at locations along the sheet materials 29, 31 dependent upon the points at which the adhesive beads 84, 86 are applied thereto. As depicted in FIGS. 9–12, the weld lines 170 are preferably formed along the length of sheet materials 29, 31 a predetermined space "S" from each of the adhesive beads 84 and 86 in both cellular articles 22*a* and 22*b*. The weld lines 170 are formed by operation of the welding devices 166, 168 carried by the upper gripper member 98 of pusher bar assembly 16. As discussed above, the ball and screw mechanisms 162, 164 are operated by controller 38 to move the welding devices 166, 168 toward one another to the center of upper gripper member 98, and then away from one another to its opposite ends. The welding devices 166, 168 are operative to heat and essentially melt the thermoplastic material within the sheet materials 29, 31 so that they attach to one another along each weld line 170. Because the welding devices 166, 168 are carried by the upper gripper member 98 of pusher bar assembly 16, such welding operation is performed with the upper and lower gripper members 98, 100 in a gripping position, i.e. in engagement with the sheet materials 29, 31 positioned therebetween. It is contemplated that the welding operation could take place at the same time as the application of adhesive beads 84, 86 to sheet materials 29, 31, or subsequent to the adhesive application operation, depending upon the desired spacing between the weld line 170 and adhesive beads 84, 86 for a cellular unit 226 of given size.

Once the sheet materials 29, 31 have been secured together along weld lines 170 at the desired distance from the adhesive beads 84, 86, the folding operation can proceed. As noted above, the fold lines 236, 238 in the cellular units 226 of article 22*a* must be centered between adjacent weld lines 170. Similarly, the fold lines 252, 254 of cellular units 240, as well as the fold lines 256, 258 of cellular units 242, must also be centered between their adjacent weld lines 170 in order to properly form the article 22*b*. An important advantage of this invention is that the position of the fold lines within cellular articles 22*a*, 22*b*, or any other cellular articles, can be varied in essentially any desired sequence during the operation of apparatus 10. The location of each fold line 236, 238, 252, 254, 256 and 258 is determined by the distance which the upper and lower gripper members 98, 100 of pusher bar assembly 16 are moved with respect to the stripper bar assembly 18 in advance of a folding operation. Such distance or spacing between the upper and lower gripper members 98, 100, and the stripper bar assembly 18, determines what portion or length of the sheet materials 29, 31 is advanced against the upper and lower stripper bars 172, 174 to form the fold lines within articles 22*a* and 22*b*. Precise control of the position of upper and lower gripper members 98, 100 with respect to the stripper bar 18 is obtained by operation of the linear actuators 134, 136 in a manner described in detail above.

For example, in order to form the cellular article 22*a* depicted in FIGS. 9 and 10, the system controller 38 operates linear actuators 134, 136 so that the upper and lower gripper members 98, 100 are moved as a unit with mounting bracket 120 to a "contact" or gripping position relative to sheet materials 29, 31. This gripping position is spaced a sufficient distance from stripper bar assembly 18 so that fold lines 236 and 238 can be formed midway between adjacent weld lines 170 of one of the cellular units 226 forming article 22*a*. Once properly located at such gripping position, the controller 38 is operative to actuate pneumatic cylinders 128, 130 of the pusher bar assembly 16 which moves the upper gripper member 98 downwardly to squeeze or clamp the sheet materials 29, 31 between the upper and lower gripper members 98, 100. At or about the same time, the controller 38 is operative to cause the upper and lower stripper bars 172, 174 to move to the folding position, i.e. toward and in contact with one another, to provide a planar surface against which that portion of the sheet materials 29, 31 between the gripper members 98, 100 and stripper bars 172, 174 can be folded. The linear actuators 134, 136 are then activated to move the gripper members 98, 100 and sheet materials 29, 31 into contact with the stripper bars 172, 174 to form fold lines 236, 238. As schematically depicted in FIG. 2, an air tube 330 is mounted to the frame 46 in position between the pusher bar assembly 16 and stripper bar assembly 18 to introduce a stream of air in a direction transverse to the movement of sheet materials 29, 31 along frame 46. This air stream assists in separating the sheet materials 29, 31 from one another in the course of movement of the gripper members 98, 100 toward the stripper bars 172, 174 to facilitate the formation of fold lines 236, 238 therein.

After a cellular unit 226 is thus formed, the upper and lower stripper bars 172, 174 are moved away from one another allowing the just formed cellular unit 226 to move therepast. Preferably, spring mechanisms (not shown) are provided for stripper bars 172 and 174 to urge them in a direction toward the gripper members 98, 100 so that the stripper bars 172, 174 can "clear", or move upstream from, the cellular unit 226 just formed. The stripper bars 172, 174 are then returned to the folding position, in contact with one another, in preparation for another folding operation.

Figure 14:
FIG. 14 is a schematic view of another article made with the apparatus herein having a contoured outer surface.

The folding operation continues as described above to form a series of interconnected, side-by-side cellular units 226 of article 22*a*. Because all of the cellular units 226 have the same dimension, the gripper members 98, 100 are returned to the same gripping position at the start of each successive folding operation. The formation of cellular article 22*b* proceeds in the identical manner as described above, except the contact or gripping positions at which gripper members 98, 100 contact the sheet materials 29, 31 changes depending on whether a cellular unit 240 or a cellular unit 242 is formed. Since such cellular units 240, 242 have different dimensions, the gripper members 98, 100 are moved further away from the stripper bars 172, 174 at the beginning of a folding operation to form cellular units 240, compared to the gripping position required to properly position the fold lines 256 and 258 for cellular units 242. Regardless of the height or size of the cellular unit to be formed, the controller 38 is operative to activate linear actuators 134, 136 and precisely locate the gripper members 98, 100 at any contact or gripping position to begin a folding operation. Consequently, an article 20*c* such as depicted in FIG. 14, can be formed with a widely varying, contoured outer surface 370, as desired.

FIGS. 9 and 11 depict the cellular articles 22*a* and 22*b*, respectively, as they appear immediately downstream from the stripper bar assembly 18. Cellular article 22*a* includes a series of side-by-side, interconnected cellular units 226, defined by adjacent weld lines 170, each having sides 228–234 with the adhesive beads 84 and 86 being applied to the first and second sides 228 and 230, respectively. The cellular article 22*b* includes an alternating pattern of interconnected cellular units 240, cellular units 242 and then additional cellular units 240.

One important use for the cellular articles 22*a* and 22*b* is in the formation of window shades and similar window treatments. Such application requires an expandable and collapsible product wherein drawstrings or cords 300 (shown in phantom) can be employed to raise and lower the cellular articles 22*a* or 22*b* with respect to the window. In order to improve the aesthetics of such window treatments, it is desirable to hide the drawstrings 300 from view when looking at the outwardly facing surface 227 article 22*a*, or the outwardly facing surface 260 of article 22*b*. This is accommodated in the present invention by forming upper and lower pockets 304, 306 between the adjacent cellular units 226 depicted in FIGS. 10 and 7, and upper and lower pockets 308, 310 in the cellular article 22*b* between adjacent cellular units 240, 242. See FIG. 9.

With reference to FIGS. 6 and 7, each upper pocket 304 comprises an elongated, open channel formed between each of the adhesive beads 84 and the weld line 170. The lower pockets 306 are formed immediately beneath upper pockets 304 and extend from adhesive bead 86 to the weld line 170. Each upper pocket 304 is formed by forcing the first side 228 of one cellular unit 226 against the third side 232 of an adjacent cellular unit 236*b* so that the adhesive bead 84 carried by first side 228 forms a bond therebetween. Similarly, each lower pocket 306 is formed immediately beneath an upper pocket 304 by causing the second side 230 of the cellular unit 226 to contact the fourth side 234 of the adjacent cellular unit 226. Such pockets 304, 306 are formed along the entire length of cellular article 22*a*, between adjacent cellular units 226, so that one or more drawstrings 300 can extend along the length of the cellular article 22*a*.

The same forming step noted above is employed to form upper and lower pockets 308, 310 of the cellular article 22*b*. When interconnecting adjacent cellular units 240 of article 22*b*, sides 244, 246 of one cellular unit 240 carrying adhesive beads 84, 86 contact sides 248, 250 of an adjacent cellular unit 240. A cellular unit 240 is connected to an adjacent cellular unit 242 to form upper and lower pockets 308, 310 by engaging sides 244, 246 of cellular unit 240 with sides 264 and 266 of cellular unit 242. The smaller cellular units 242 are connected to one another to form pockets 308, 310 by forcing the sides 260, 262 of a cellular unit 242 carrying adhesive beads 84, 86, into contact with the sides 264 and 266 of an adjacent cellular unit 242. These same sides 260, 262 of a smaller cellular unit 242 contact and bond to the sides 248 and 250 of an adjacent, larger cellular unit 240 to form pockets 308, 310 therebetween. It is contemplated that both cellular units 22*a* and 22*b* could be formed with pockets 304, 306, and 308, 310, as described above by squeezing the units 22*a*, 22*b* between a forming bar 312, depicted schematically in FIG. 2, and the stripper bar 172, 174, or by other suitable pressing members.

In addition to hiding the drawstrings 300, the pockets 304, 306 of article 22*a* and pockets 308, 310 of article 22*b* provide strength and rigidity to the cellular units 226, 240 and 242, and the resulting cellular articles 22*a*, 22*b*. The weld lines 170 formed by welding devices 166, 168 may not provide sufficient structural integrity within the cellular articles 22*a* or 22*b*, particularly when they are utilized in a window treatment and are regularly expanded and collapsed when the window treatment is raised and lowered. The adhesive beads 84 and 86 overcome this potential limitation and ensure that the cellular articles 22*a* and 22*b* do not come apart or otherwise fail in a window treatment or other application.

Figure 8:
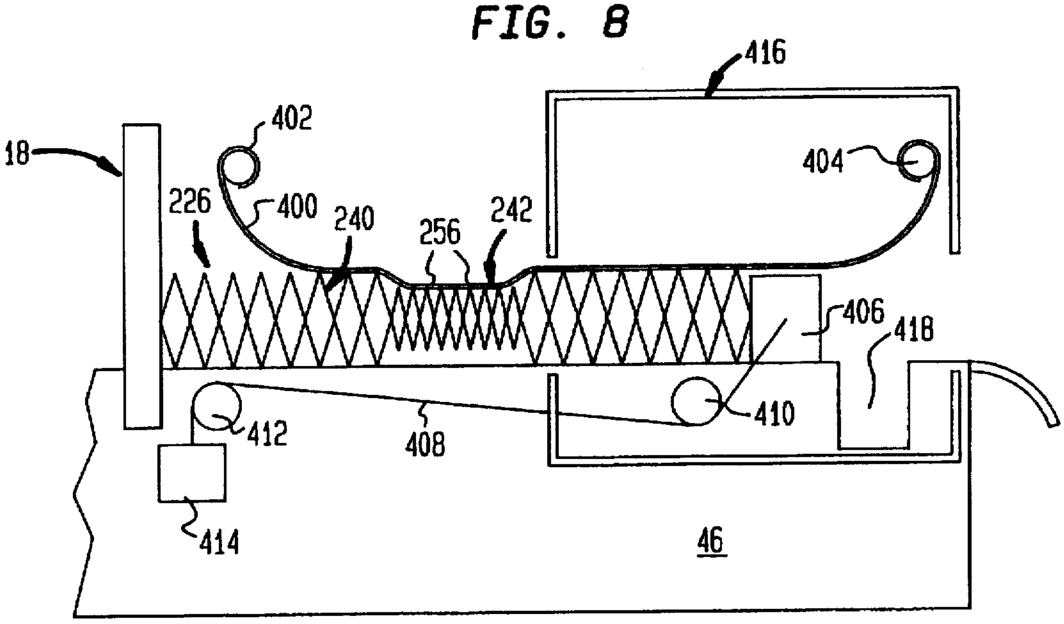
FIG. 8 is a schematic view of a portion of the apparatus herein downstream from the stripper bar.

With reference to FIG. 8, the portion of apparatus 10 downstream from the stripper bar assembly is schematically depicted. This is where the cellular articles 22*a* or 22*b* are moved together and cured to form the pockets 304, 306 and 308, 310 described above. In the presently preferred embodiment, a belt 400 formed of stainless steel mesh or similar material is mounted at either end to rods 402, 404 in position to contact the uppermost edges or fold lines 236 of cellular article 22*a* and the fold lines 252, 256 of cellular article 22*b* located atop the frame 46. The weight of belt 400 against articles 22*a*, 22*b* is sufficient to prevent adjacent cellular units 226, 240 and 242 from moving apart, and it also increases the frictional engagement between the cellular units 226, 240 and 242 and the frame 46.

In order to assist in "squeezing" or urging adjacent cellular units 226 or 240, 242 together, a retaining bar 406 is initially positioned atop the frame 46 against the first formed cellular unit 240, 242 (or 226). The retaining bar 406 is connected by a cable 408, directed over pulleys 410, 412 mounted on frame 46, to a counterweight 414. The purpose of the retaining bar 406 is to exert a force against the cellular units 240, 242 (or 226) located downstream from the stripper bar assembly 18 to urge them together so that the adhesive beads 84, 86 of one cellular unit 240, 242 contact the exposed sides of an adjacent cellular unit 240, 242. The weight of the counterweight 414 can be varied, depending upon the size of the cellular units being formed, to exert the desired amount of upstream force against the "stack" or group of cellular units being formed.

The stack of cellular units 226 and retaining bar 406 proceed into an oven 416 of the type commercially available from R & K Machine Corp. of Sarasota, Fla. The oven 416 is effective to heat the hot melt adhesive beads 84, 86 to a sufficient temperature to form a bond between adjacent cellular units 240, 242 (or 226), thus forming pockets 308, 310. The pockets 304, 306 of cellular article **22*a*** are formed in the same manner.

Once the retaining bar 406 reaches the end of oven 416, it falls into a recess 418 within frame 46 and extends substantially flush with the upper surface of frame 46. By this time, a sufficient number of cellular units 240, 242 (or 226) have been formed downstream from the stripper bar assembly 18 such that a force is exerted in a downstream direction against all of the cellular units 240, 242 (or 226) atop frame 46. In other words, the sheer number and frictional engagement of the stack of cellular units 240, 242 atop frame 46, assisted by the weight of belt 400, is sufficient to cause adjacent cellular units 226 to contact one another as soon as they are formed and move past the stripper bar assembly 18. As a result, finished cellular articles **22*a* and 22*b* as shown in FIGS. 10 and 12 are formed within the oven 416 and are discharged from the end of frame 46**.

Method of Forming Accordion-Folded Articles

Figure 13:
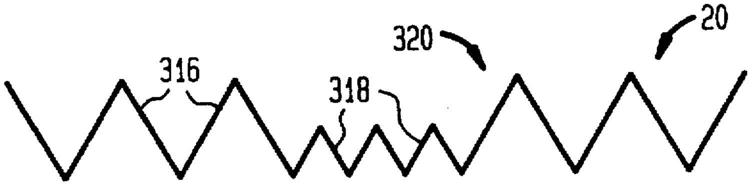
FIG. 13 is a schematic view of a zig-zag or accordion folded article made with the apparatus of this invention.

The zig-zag or accordion folded articles 20 and **20*a* depicted in FIGS. 13 and 14 are formed in essentially the identical manner described above in connection with cellular articles 22*a* and 22*b*, except the adhesive beads 84, 86 and weld lines 170 are eliminated. Further, only a single sheet material 29 or 31 is required, and, preferably, a pre-creaser bar 350 is employed to assist in the folding operation. As noted above, the pre-creaser bar 350 is located between the pusher bar assembly 16 and stripper bar assembly 18, and is effective to move upwardly into contact with a sheet material 29 or 31 in advance of movement of the upper and lower gripper members 98, 100 into contact with stripper bars 172, 174 so that a "bow" or pre-fold is made in such sheet material 29 or 31 before the fold line is formed. The operation of apparatus 10 is otherwise similar, including movement of the upper and lower gripper members 98, 100 of pusher bar assembly 16 and movement of the stripper bars 172, 174 of stripper bar assembly 18. As schematically depicted in FIGS. 13 and 14, the resulting zig-zag or accordion folded article 20 is formed with a series of side-by-side pleats 316, 318, or a variety of different pleats as in article 20*a*, having the same or a variety of different heights in essentially any predetermined sequence. Such sequence is either programmed into the system controller 38, or is determined by indicia 263 as described below, so that the controller 38 operates the linear actuators 134, 136 to locate the upper and lower gripper members 98, 100 of the pusher bar assembly 16 at the desired contact or gripping position at the beginning of each successive folding operation. Consequently, an accordion folded article 20 or 20*a* can be produced having an outwardly facing surface 320 or 370** with essentially any contoured outer surface, or a planer outer surface, as desired.

It is also contemplated that an accordion folded article **20, 20*a* or the like can be formed with varying pleat heights using the pre-creaser bar 350 alone, or in combination with the pusher bar assembly 16. Because the pre-creaser bar 350 is movable in response to the operation of ball and screw mechanisms 352, 354, its vertical position with respect to a sheet material 29 or 31 moving thereabove can be varied, as desired. With the upper and lower stripper bars 172, 174 in contact with one another, thus clamping or gripping a sheet material 29 or 31 therebetween, and the upper and lower gripper members 98, 100 of pusher bar assembly 16 spaced from one another, movement of the pre-creaser bar 150 vertically upwardly causes a "bow" to form in the sheet material 29 or 31 which pulls or draws a greater length of sheet material 29 or 31 between the pusher bar assembly 16 and stripper bar assembly 18 than would be present if the sheet material 29 or 31 were flat therebetween. In other words, a portion of the sheet material 29 or 31 is effectively pulled or drawn downstream toward the stripper bar assembly 18 because of the bow formed by the pre-creaser bar 350. The portion or length of sheet material 29 or 31 drawn downstream is variable, depending upon the extent of vertical movement of the pre-creaser bar 350, as governed by ball and screw mechanisms 352, 354. Consequently, when the pusher bar assembly 16 is thereafter operated to grip the sheet material 29 or 31 and move it into contact with the pusher bar assembly 18, different size pleat heights can be formed depending upon the extent of vertical movement of the pre-creaser bar 350, and, hence, the length or amount of sheet material 29 or 31 pulled or drawn downstream by the pre-creaser bar 350**.

It is further contemplated that the above-described method of varying pleat height within an accordion folded article by adjusting the vertical movement of pre-creaser bar 350 could be done independently, or in combination with, variable movement of the pusher bar assembly 16. That is, variable pleat heights can be obtained by varying the extent of vertical movement of pre-creaser bar 350 while successively moving the pusher bar assembly 16 to the same gripping position relative to the stripper bar assembly 18, or, alternatively, by varying both the positioning of the pre-creaser bar 350 and the contact position of the pusher bar assembly 16 along the sheet material 29 or 31 as described above. In either instance, an accordion folded article is produced with varying pleat heights.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

For example, the pusher bar assembly 16 depicted in the FIGURES. is shown with upper and lower gripper members 98, 100. It is contemplated, however, that one of the gripper members 98 or 100 could be eliminated so that a single plate or gripper member would be employed to advance one or both of the sheet materials 29, 31 into engagement with the stripper bars 172, 174 if desired. Additionally, the stripper bar assembly 18 could be formed with a single upper or lower stripper bar 172, 174 without departing from the scope of the invention. Further, while both of the stripper bars 172, 174 have been described as being movable in a vertical direction, it is contemplated that the lower stripper bar 174, for example, could be maintained in a fixed position while only the upper stripper bar 172 would be moved vertically with respect thereto.

It is also contemplated that the adhesive beads 84, 86 applied by the adhesive applicator assembly 14 could be continuous or discontinuous across the width of sheet materials 29, 31, as desired, so long as the resulting articles **22*a* and 22*b* retain their structural integrity. Additionally, while the welding devices 166, 168 are shown in the FIGURES. as being mounted to the pusher bar assembly 16, it is contemplated that they could be mounted on separate structure and/or to the adhesive applicator assembly 14**, as desired.

It is also considered within the scope of this invention to employ apparatus 10 solely as a folding device for cellular articles without the operation of the adhesive applicator assembly 14 or welding devices 166, 168. It is contemplated that the sheet materials 29 and 31 could be interconnected along weld lines 170, and provided with adhesive beads 84, 86, on a separate piece of equipment and then collected in rolls. These rolls would then be mounted to the feed mechanism 12 of apparatus 10, and the folds would be formed by operation of the sensor 261 picking up an indicia on the sheet materials 29 or 31, such as an adhesive bead 84, so that the controller 38 could operate pusher bar assembly 16 accordingly, in the manner described above.

Therefore, it is intended that the invention not be limited to the particular embodiment disclosed as the best mode contemplated for carrying out this invention, but the invention will include all embodiments falling within the scope of the appended claims.

We claim:

1. Apparatus for forming an expandable-collapsible product from sheet material, comprising:
   - a frame along which the sheet material is movable;
   - a stripper bar movable with respect to said frame between a folding position proximate said frame, and a discharge position spaced from said frame;
   - a pusher bar movable toward and away from said stripper bar in successive folding operations, said pusher bar being effective in the course of each folding operation to contact the sheet material at a contact position spaced from said stripper bar and to move a portion of the sheet material in a direction toward said stripper bar so that the sheet material contacts said stripper bar at said folding position;
   - a drive mechanism, associated with said pusher bar, including at least one drive member which is adjustable so as to be capable of varying the location of each successive contact position at which said pusher bar contacts the sheet material whereby a selected length of sheet material can be moved into contact with said stripper bar during each of said folding operations.

2. The apparatus of claim 1 in which said drive member is a linear actuator.

3. The apparatus of claim 2 further including a programmable controller which is effective to control the operation of said linear actuator so that the location of said contact position can be varied as desired.

4. The apparatus of claim 2 in which said linear actuator is a ball and screw mechanism.

5. The apparatus of claim 1 further including a second drive mechanism, associated with said stripper bar, including at least one drive member operative to vary said discharge position of said stripper bar relative to said frame.

6. The apparatus of claim 5 in which said driver member of said second drive mechanism is operative to vary said folding position of said stripper bar with respect to said frame.

7. The apparatus of claim 5 in which said second drive mechanism includes at least one linear actuator operative to move said stripper bar in a direction substantially perpendicular to the direction of movement of the sheet material along said frame.

8. The apparatus of claim 7 in which said linear actuator is a ball and screw mechanism.

9. The apparatus of claim 1 further including a pre-creaser bar located between said pusher bar and said stripper bar, said pre-creaser bar being effective to contact and move the sheet material in a direction generally perpendicular to the movement of the sheet material along said frame in the course of movement of said pusher bar toward said stripper bar.

10. Apparatus for forming an expandable-collapsible product from sheet material, comprising:
   - a frame along which the sheet material is movable;
   - a stripper bar movable with respect to said frame between a folding position proximate said frame and a discharge position spaced from said frame;
   - a pusher bar movable toward and away from said stripper bar in successive folding operations, said pusher bar having an upper gripper member and a lower gripper member at least one of which is movable relative to the other in a direction substantially perpendicular to the direction of movement of the sheet material along said frame, said upper and lower gripper members being effective in the course of each folding operation to grip the sheet therebetween at a gripping position spaced from said stripper bar and to move a portion of the sheet material in a direction toward said stripper bar so that the sheet material contacts said stripper bar at said folding position;
   - a drive mechanism, associated with said pusher bar, including at least one drive member which is adjustable so as to be capable of varying the location of each successive gripping position at which said upper and lower gripper members contact the sheet material whereby a selected length of sheet material can be moved into contact with said stripper bar during each of said folding operations.

11. The apparatus of claim 10 in which said pusher bar includes a mounting bracket extending between said upper and lower gripper members, said mounting bracket supporting said upper gripper member in a position vertically above said lower gripper member.

12. The apparatus of claim 11 in which said mounting bracket carries at least one linear actuator which is effective to move said upper gripper member toward and away from said lower gripper member.

13. The apparatus of claim 12 in which said at least one linear actuator is a pneumatic cylinder.

14. The apparatus of claim 10 in which two webs of sheet material, one atop the other, are moved along said frame, at least one of said upper and lower gripper members of said pusher bar mounting an attachment device for interconnecting said two webs of sheet material at selected locations along the length thereof.

15. The apparatus of claim 14 in which said attachment device is an ultrasonic welding device.

16. The apparatus of claim 14 further including a ball and screw mechanism operative to move said attachment device along said upper gripper member in a direction generally perpendicular to the direction of movement of the sheet material along said frame.

17. The apparatus of claim 10 in which said drive member is a linear actuator.

18. The apparatus of claim 17 further including a programmable controller which is effective to control the operation of said linear actuator so that the location of said gripping position can be varied as desired.

19. The apparatus of claim 17 in which said linear actuator is a ball and screw mechanism.

20. The apparatus of claim 10 in which said stripper bar is formed with an upper stripper member and a lower stripper member, at least one of said upper and lower stripper members being movable with respect to the other between said folding position and said discharge position.

21. The apparatus of claim 20 further including a linear actuator for moving at least one of said upper and lower stripper members relative to the other in a direction substantially perpendicular to the direction of movement of the sheet material along said frame.

22. The apparatus of claim 21 in which said stripper bar includes a mounting bracket extending between said upper and lower stripper members, said mounting bracket supporting said upper stripper member in a position vertically above said lower stripper member.

23. The apparatus of claim 22 in which said mounting bracket carries at least one linear actuator which is effective to move at least one of said upper and lower stripper members toward and away from the other.

24. The apparatus of claim 23 in which said linear actuator is a ball and screw mechanism.

25. The apparatus of claim 10 further including a pre-creaser bar located between said pusher bar and said stripper bar, said pre-creaser bar being effective to contact and move the sheet material in a direction generally perpendicular to the movement of the sheet material along said frame in the course of movement of said pusher bar toward said stripper bar.

26. Apparatus for forming an expandable-collapsible product from sheet material, comprising:

a frame along which the sheet material is movable;

a stripper bar including an upper stripper member and a lower stripper member, at least one of said upper and lower stripper members being movable in a direction substantially perpendicular to the direction of movement of the sheet material along said frame between a folding position at which said upper and lower stripper member are proximate one another and a discharge position at which said upper and lower stripper members are spaced from one another;

a pusher bar movable toward and away from said stripper bar in successive folding operations, said pusher bar being effective in the course of each folding operation to contact the sheet material at a contact position spaced from said stripper bar and to move a portion of the sheet material in a direction toward said stripper bar so that the sheet material contacts said stripper bar at said folding position;

a drive mechanism, associated with said pusher bar, including at least one drive member which is adjustable so as to be capable of varying the location of each successive contact position at which said pusher bar contacts the sheet material whereby a selected length of sheet material can be moved into contact with said stripper bar during each of said folding operations.

27. The apparatus of claim 26 in which said drive member is a linear actuator.

28. The apparatus of claim 27 further including a programmable controller which is effective to control the operation of said linear actuator so that the location of said contact position can be varied as desired.

29. The apparatus of claim 26 further including a second drive mechanism, associated with said stripper bar, including at least one drive member operative to move at least one of said upper and lower stripper members to selectively vary said folding position and said discharge position.

30. The apparatus of claim 26 in which said stripper bar includes a mounting bracket extending between said upper and lower stripper members, said mounting bracket supporting said upper stripper member in a position vertically above said lower stripper member.

31. The apparatus of claim 30 in which said mounting bracket carries at least one linear actuator which is effective to move at least one of said upper and lower stripper members toward and away from the other.

32. The apparatus of claim 31 in which said linear actuator is a ball and screw mechanism.

33. The apparatus of claim 26 further including a pre-creaser bar located between said pusher bar and said stripper bar, said pre-creaser bar being effective to contact and move the sheet material in a direction generally perpendicular to the movement of the sheet material along said frame in the course of movement of said pusher bar toward said stripper bar.

34. Apparatus for forming an expandable-collapsible cellular product from two webs of sheet material, comprising:

a frame along which the two sheet materials are movable one on top of the other;

a stripper bar movable with respect to said frame between a folding position proximate said frame, and a discharge position spaced from said frame;

a pusher bar movable toward and away from said stripper bar, said pusher bar being effective to contact the two sheet materials at a contact position spaced from said stripper bar and to move a portion of the two sheet materials in a direction toward said stripper bar so that the two sheet materials contact said stripper bar at said folding position;

a first attachment device which is operative to interconnect the two sheet materials at spaced locations therealong in the direction of movement of the two sheet materials along said frame;

a second attachment device which is effective to apply a bead of adhesive to each of the two sheet materials at locations proximate to each point of interconnection between the webs.

35. The apparatus of claim 34 in which said first attachment device is at least one ultrasonic welder.

36. The apparatus of claim 35 in which said first attachment device is mounted to said pusher bar, said first attachment device further including a ball and screw mechanism operative to move said ultrasonic welder along said pusher bar in a direction generally perpendicular to the direction of movement of the two sheet materials along said frame.

37. The apparatus of claim 34 in which said second attachment device comprises at least one pair of first and second adhesive dispensers, said at least one first adhesive dispenser being effective to apply a first bead of adhesive across one of the two sheet materials in a direction transverse to the movement thereof along said frame, and said at least one second adhesive dispenser being effective to apply a second bead of adhesive to the other of the two sheet materials opposite said first adhesive bead.

38. The apparatus of claim 34 further including a blower device located between said pusher bar and said stripper bar, said blower device being operative to direct a stream of air between the two sheet materials in the course of movement of said pusher bar toward said stripper bar to separate the two sheet materials in preparation for folding.

39. The apparatus of claim 34 further including a drive mechanism, associated with said pusher bar, including at least one drive member which is adjustable to selectively vary the location of said gripping position at which said pusher bar contacts the two sheet materials so that a variety of different lengths of the two sheet materials can be moved into contact with said stripper bar.

40. The apparatus of claim 39 in which said drive member is a linear actuator.

41. The apparatus of claim 40 further including a programmable controller which is effective to control the operation of said linear actuator so that the location of said gripping position can be varied as desired.

42. The apparatus of claim 40 in which said linear actuator is a ball and screw mechanism.

43. The apparatus of claim 34 in which said pusher bar includes a mounting bracket extending between an upper griper member and a lower gripper member, said mounting bracket supporting said upper gripper member in a position vertically above said lower gripper member.

44. The apparatus of claim 43 in which said mounting bracket carries at least one linear actuator which is effective to move said upper gripper member toward and away from said lower gripper member.

45. The apparatus of claim 34 in which said stripper bar is formed with an upper stripper member and a lower stripper member, at least one of said upper and lower stripper members being movable with respect to the other between said folding position and said discharge position.

46. The apparatus of claim 45 further including a linear actuator for moving at least one of said upper and lower stripper members relative to the other in a direction substantially perpendicular to the direction of movement of the sheet material along said frame.

47. The apparatus of claim 46 in which said stripper bar includes a mounting bracket extending between said upper and lower stripper members, said mounting bracket supporting said upper stripper member in a position vertically above said lower stripper member.

48. The apparatus of claim 47 in which said mounting bracket carries at least one linear actuator which is effective to move at least one of said upper and lower stripper members toward and away from the other.

49. The apparatus of claim 48 in which said linear actuator is a ball and screw mechanism.

50. Apparatus for forming an expandable-collapsible product from sheet material, comprising:

a frame having a surface along which the sheet material is movable;

a stripper bar movable with respect to said frame between a folding position proximate said frame, and a discharge position spaced from said frame;

a pusher bar movable toward and away from said stripper bar, said pusher bar being effective to contact the sheet material at a contact position spaced from said stripper bar and to move a portion of the sheet material in a direction toward said stripper bar so that the sheet material contacts said stripper bar at said folding position;

a pre-creaser bar located between said pusher bar and said stripper bar in position beneath the sheet material and beneath said frame surface, said pre-creaser bar being movable to an engagement position in contact with the sheet material and above said frame surface thus moving a portion of the length of the sheet material in a direction toward said stripper bar;

a drive mechanism, associated with said pre-creaser bar, including at least one drive member which is adjustable to selectively vary said engagement position at which said pre-creaser bar contacts the sheet material so that a variety of different lengths of the sheet material can be moved into position between said pusher bar and said stripper bar for folding.

51. The apparatus of claim 50 in which said drive member is a linear actuator.

52. The apparatus of claim 51 further including a programmable controller which is effective to control the operation of said linear actuator so that the location of said engagement position can be varied as desired.

53. The apparatus of claim 50 further including a second drive mechanism, associated with said pusher bar, including at least one drive member operative to selectively vary the location of said contact position at which said pusher bar contacts the sheet material.

54. Apparatus for forming an expandable-collapsible product from sheet material, comprising:

a frame along which the sheet material is movable;

a stripper bar movable with respect to said frame between a folding position proximate said frame, and a discharge position spaced from said frame;

a pusher bar assembly including a pusher bar movable toward and away from said stripper bar in successive folding operations, said pusher bar being effective in the course of each folding operation to contact the sheet material at a contact position spaced from said stripper bar and to move a portion of the sheet material in a direction toward said stripper bar so that the sheet material contacts said stripper bar at said folding position;

a controller, operatively connected to said pusher bar assembly, which is effective to selectively control the location of each successive contact position at which said pusher bar contacts the sheet material so that a selected length of sheet material can be moved into contact with said stripper bar during each of said folding operations.

55. The apparatus of claim 54 in which said pusher bar assembly includes a drive mechanism having at least one drive member which is adjustable to permit said selected variation of the location of said contact position of said pusher bar during each successive folding operation.

56. The apparatus of claim 55 in which said controller is a programmable controller operatively connected to said drive mechanism, said programmable controller being effective to control the operation of said at least one drive member.

57. Apparatus for forming an expandable-collapsible product from sheet material, comprising:

a frame along which the sheet material is movable;

a stripper bar movable with respect to said frame between a folding position proximate said frame, and a discharge position spaced from said frame;

a pusher bar assembly including a pusher bar movable toward and away from said stripper bar in successive folding operations, said pusher bar being effective in the course of each folding operation to contact the sheet material at a contact position spaced from said stripper bar and to move a portion of the sheet material in a direction toward said stripper bar so that the sheet material contacts said stripper bar at said folding position;

a sensor operative to sense the presence of an indicia on the sheet material and to produce a corresponding signal;

a controller operatively connected to said pusher bar assembly and to said sensor, said controller being effective in response to receipt of said signal from said sensor to cause said pusher bar to move to a contact position at a selected location on the sheet material.

58. The apparatus of claim 57 in which said controller is a programmable controller.

59. The apparatus of claim 57 in which said pusher bar assembly includes a drive mechanism having at least one drive member which adjustable to permit selective variation of the location of said contact position of said pusher bar during each successive folding operation.

60. The apparatus of claim 59 in which said drive member is a linear actuator.

61. The apparatus of claim 60 in which said linear actuator is a ball and screw mechanism.

62. The apparatus of claim 57 further including a second drive mechanism, associated with said stripper bar, including at least one drive member operative to vary said discharge position of said stripper bar relative to said frame.

63. The apparatus of claim 62 in which said drive member of said second drive mechanism is operative to vary said folding position of said stripper bar with respect to said frame.

64. The apparatus of claim 62 in which said second drive mechanism includes at least one linear actuator operative to move said stripper bar in a direction substantially perpendicular to the direction of movement of the sheet material along said frame.

65. The apparatus of claim 64 in which said linear actuator is a ball and screw mechanism.

66. The apparatus of claim 57 in which said indicia on the sheet material is a portion of a pattern applied to the sheet material.

67. The apparatus of claim 57 in which said indicia on the sheet material is an adhesive bead.

* * * * *